No. 888,932. PATENTED MAY 26, 1908.
H. H. ROHLF.
AUTOMOBILE SLED ATTACHMENT.
APPLICATION FILED SEPT. 9, 1907.
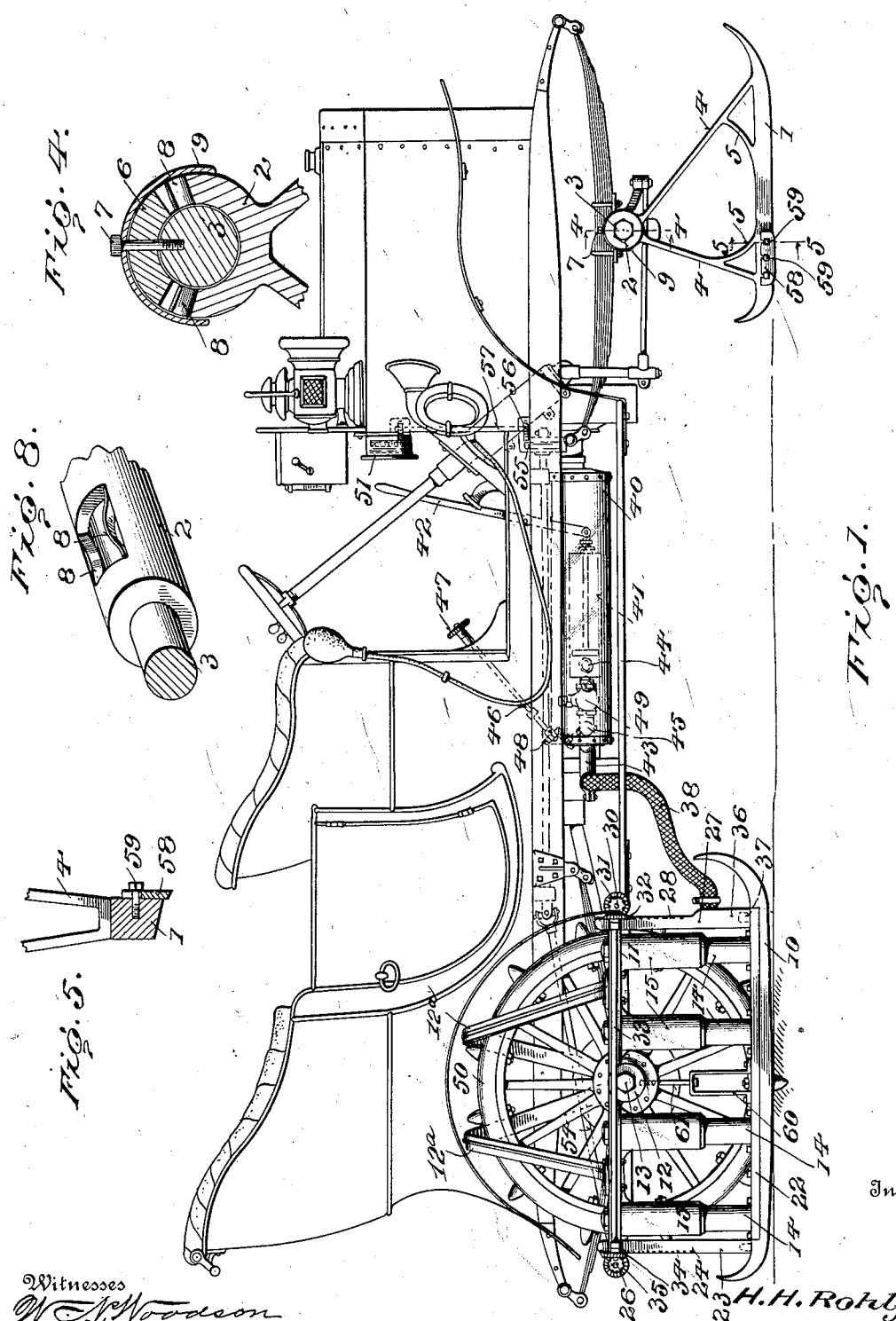

No. 888,932. PATENTED MAY 26, 1908.
H. H. ROHLF.
AUTOMOBILE SLED ATTACHMENT.
APPLICATION FILED SEPT. 9, 1907.
3 SHEETS—SHEET 2.
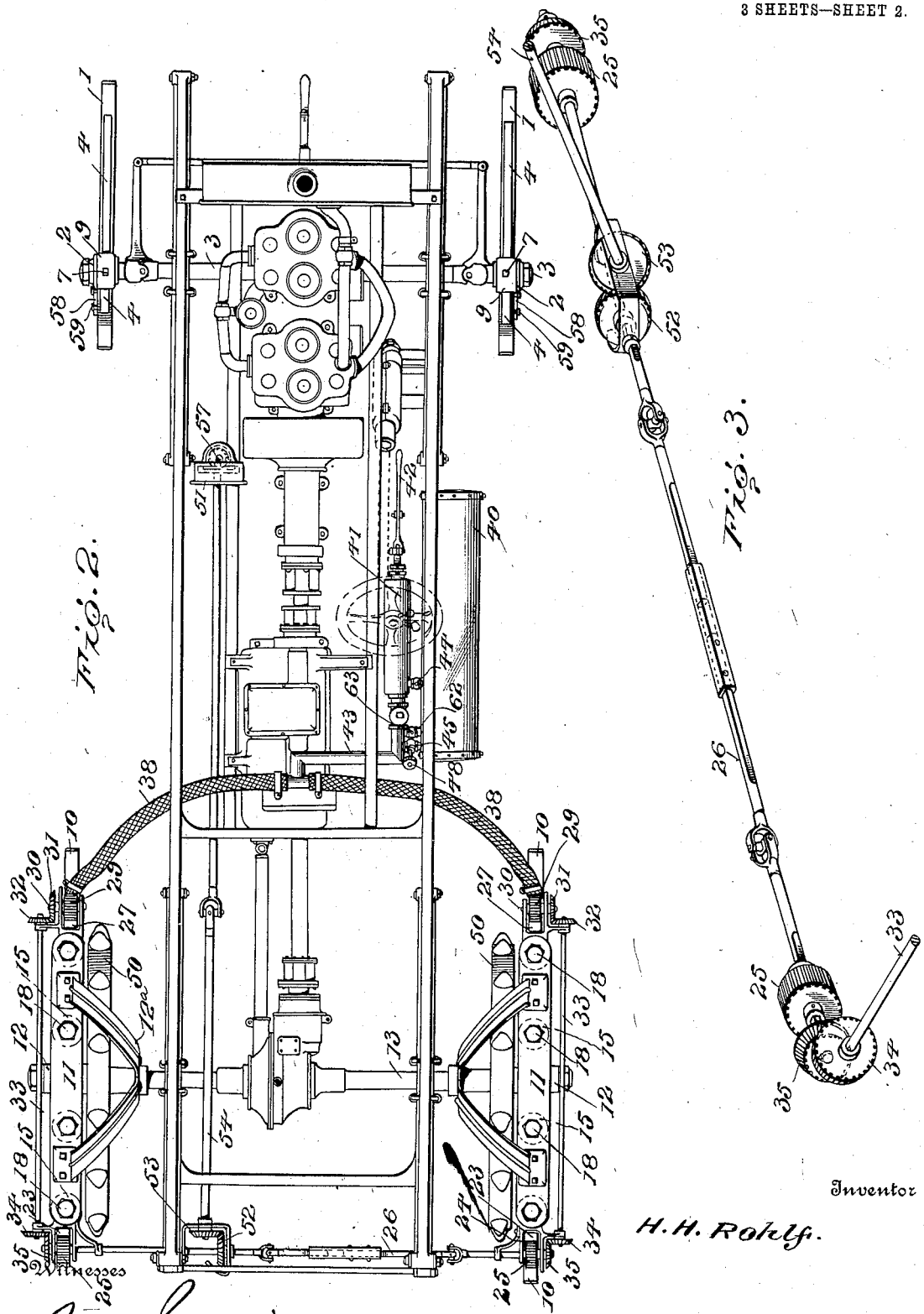

No. 888,932. PATENTED MAY 26, 1908.
H. H. ROHLF.
AUTOMOBILE SLED ATTACHMENT.
APPLICATION FILED SEPT. 9, 1907.
3 SHEETS—SHEET 3.
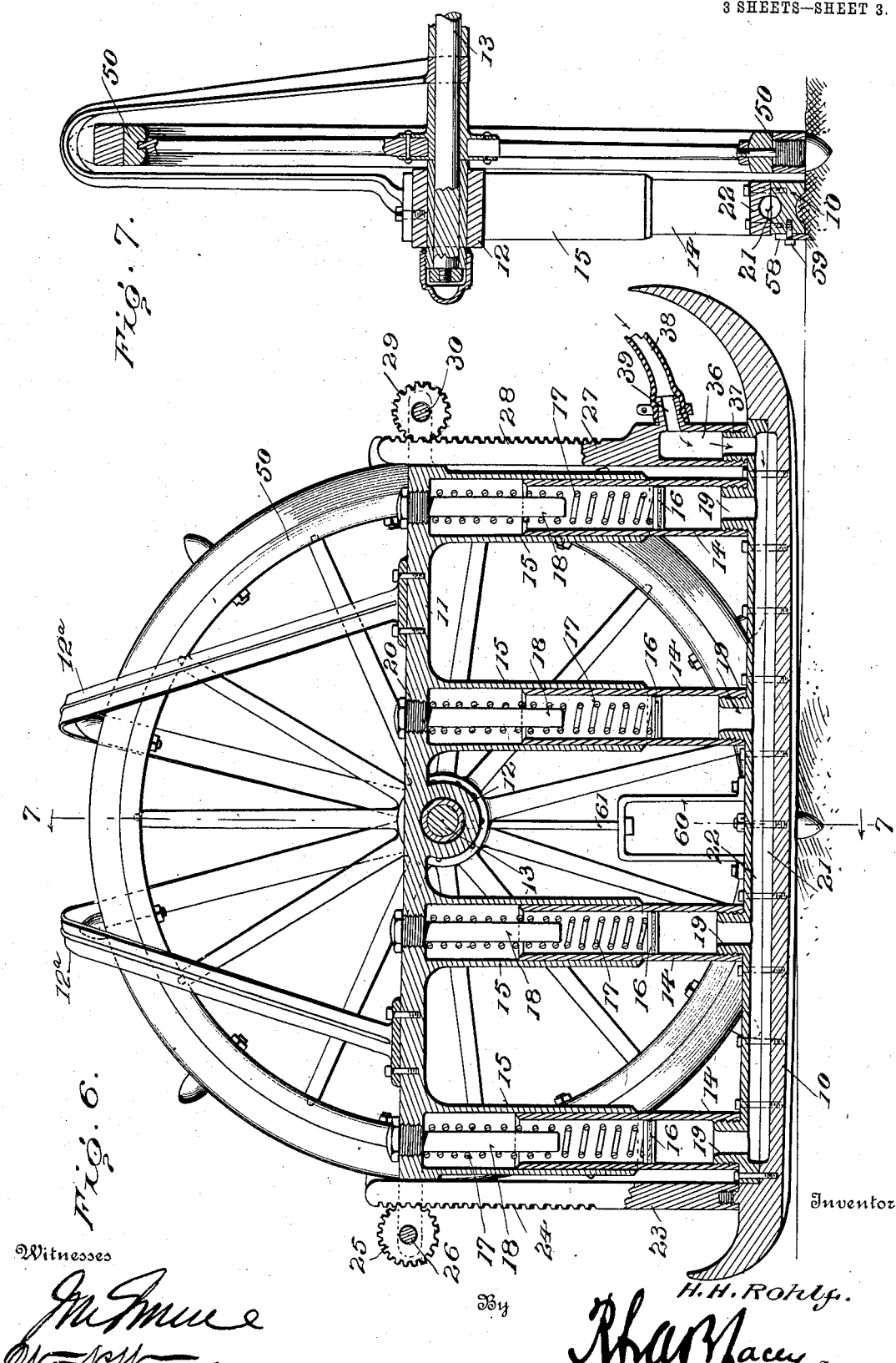

UNITED STATES PATENT OFFICE.

HENRY H. ROHLF, OF NEW LONDON, WISCONSIN, ASSIGNOR OF ONE-THIRD TO ADOLPH L. HAASE, OF NEW LONDON, WISCONSIN.

AUTOMOBILE SLED ATTACHMENT.

No. 888,932.     Specification of Letters Patent.     Patented May 26, 1908.

Application filed September 9, 1907. Serial No. 391,985.

To all whom it may concern:

Be it known that I, HENRY H. ROHLF, citizen of the United States, residing at New London, in the county of Waupaca and State of Wisconsin, have invented certain new and useful Improvements in Automobile Sled Attachments, of which the following is a specification.

The present invention appertains to a sled attachment for mechanically propelled vehicles, such as automobiles, whereby the usual supporting and drive wheels may be replaced by runners and drivers, thereby enabling a motor vehicle to be readily converted into an automobile sled.

The invention contemplates relatively movable runners and drivers and interposed jacks operable by means of a fluid medium, the latter being under control of the operator to admit of the drivers being thrown into or out of operative position, as may be required, or to any intermediate position according to the nature of the surface over which the sled may be traveling.

The invention also contemplates equalizing means between the movable drivers and runners to insure uniform and synchronous movement, which is essential to the ease and comfort of the rider and to a steady application of the propulsive force to obviate strain upon the driving mechanism and a jerky action.

The invention further contemplates means to indicate the relative position of the runners and drivers, so that the projection of the drive cogs below the runner may be ascertained at any time upon reference to an indicator which is acutated by vertical movement of the drivers when adjusting the same to throw them out of action or into operative position.

The invention also further consists of the novel features, details of construction and combinations of the parts which hereinafter will be more particularly set forth, illustrated and finally claimed.

In the drawings hereto attached forming a part of the specification: Figure 1 is a side view of an automobile equipped with the attachment and converted into a mechanically propelled sled. Fig. 2 is a top plan view of the running gear, the body being removed. Fig. 3 is a detail perspective view of the equalizing mechanism. Fig. 4 is a sectional view of the hub of a front runner and the axle arm to which the same is fitted. Fig. 5 is a sectional view of the front runner on the line 5—5 of Fig. 1. Fig. 6 is a view in elevation of a rear runner and driver, parts being in section. Fig. 7 is a sectional view of the parts shown in Fig. 6, taken on the line 7—7 thereof. Fig. 8 is a detail perspective view of the hub portion of a front runner, showing more clearly the arrangement and formation of the cushioning springs.

Corresponding and like parts are referred to in the following description and indicated in all the views of the drawings by the same reference characters.

Fig. 1 represents a two seat automobile equipped with the invention and converted into a sled. It is to be understood in this connection that the invention with slight modifications may be adapted to any style or make of mechanically propelled machines. The invention embodies corresponding front and rear runners, the front runners being mounted upon the usual axle arms after the front wheels of the machine have been removed. The rear runners and drivers replace the accustomed rear drive wheels of an automobile and are fitted to the spindles or arms of the rear axle.

The front runners 1 are connected to or provided with hubs 2 which are slipped upon the front axle arms 3 and are adapted to have a limited play thereon to admit of the runners adapting themselves to inequalities in the surface over which the machine may be propelled. Standards connect the hubs 2 with the runners 1 and each standard consists of upwardly converged bars 4 and braces 5. The hub 2 is cut away upon its upper side to receive a segment 6 which is connected to the axle arm 3 by means of a fastening 7. The segment 6 corresponds in length to the cut away portion of the head 2, thereby preventing any movement thereof lengthwise of the axle arm 3. The circumferential length of the segment 6 is less than the corresponding length of the cut away portion of the hub, thereby admitting of the latter having oscillatory movement upon the axle arm. The spring 8 is interposed between each end of the segment 6 and the proximal side of the hub bordering upon the cut away portion thereof. The springs 8 act as cushions and serve to maintain the runners in given position. A cap plate 9 closes the upper side of the recess or cut away portion of the hub 2 and extends over the segment 6 and springs 8 and houses and protects the same while excluding dust and other foreign matter from the said recess or cut away portion of the hub. This cap plate 9 is held in place preferably by means of the fastening 7 and does not interfere in the least with the oscillatory movements of the runner.

The rear runners 10 are of like formation and the adjunctive parts coöperating therewith are duplicates, hence a detail description of one will suffice for a clear understanding of both. An adjusting mechanism is interposed between each runner 10 and its supporting framework, and this adjusting mechanism consists of a plurality of fluid operated jacks under control of the operator, thereby admitting of the framework being adjusted vertically so as to either project the drivers into operative position to a greater or less extent or to entirely withdraw them from an operative position. The runner framework consists of a longitudinal bar 11 and an arched brace or stay 12ª. The bar 11 is located some distance above the runner 10 and has a parallel arrangement therewith and is provided at an intermediate point with a bearing 12 which receives the arm or spindle of the rear axle 13. The fluid operated jacks are interposed between the bar 11 and the runner 10 and each consists of cylinders 14 and 15, a plunger 16 and coöperating means between said plunger and the bar 11, the same consisting of a spring 17 and a rod 18, the latter having connection at its upper end with the bar 11 and serving to stiffen the spring 17 and to limit the upward movement of the plunger 16. The cylinders 14 are connected to the runner 10, whereas the cylinders 15 are connected with the bar 11, the two cylinders telescoping and having a close fit. Threaded nipples 19 projected upward from the runner 10, have the lower ends of the cylinders 14 secured thereto by screw thread connection, thereby admitting of said cylinders being removed when required. The cylinders 15 may be connected to the bar 11 in any manner or may be formed therewith. The plungers 16 have a piston fit within the cylinders 14 and the springs 17 are sufficiently stout to sustain the weight of the load. The rods 18 have screw thread connection at their upper ends with the bar 11 and perform the double office of stops and guides or stiffeners for the springs 17. The upper ends of the rods 18 are enlarged and externally threaded, as indicated at 20, and are screwed into corresponding openings formed in the bar 11. The upper ends of the enlarged threaded portions 20 are made angular to receive a wrench, spanner or like tool to admit of turning the rods either when screwing the same home or unscrewing the same from the bar 11. The nipples 19 are in communication with an opening 21 formed lengthwise of the runner 10, thereby admitting of the operating fluid having free passage between the runner and the lower members 14 of the jacks. The longitudinal opening 21 in the runner may be provided in any manner. For convenience the upper side of the runner is channeled and is closed by means of a cap plate 22 which is correspondingly channeled in its lower side, two channels unitedly forming the opening 21. The cap plate 22, when placed in position upon the runner is bolted or otherwise securely fastened thereto. The nipples 19 are applied to the cap plate 22 and are preferably an integral part thereof.

A standard 23 projects vertically from the rear portion of the runner 10 and passes through an opening in the rear portion of the bar 11. This standard has a portion toothed, as indicated at 24, to mesh with a pinion 25 fast to an end portion of an equalizing shaft 26 running transversely of the machine and journaled in bearings of the bar 11 and the framework of the running gear. As the bar 11 is moving vertically by the action of the jacks, the pinion 25 and shaft 26 receive a corresponding vertical movement, and by reason of the toothed connection between said pinion 25 and the standard 23, the said pinion and shaft 26 receive a rotary movement, since both rear runners 10 are similarly equipped, a vertical movement of one is transmitted to the other, thereby causing both sides of the machine to move alike. A standard 27, rising from the front portion of the runner 10, is toothed along one side, as 28, which is in mesh with a pinion 29 fast to a shaft 30 mounted in bearings at the front end of the bar 11 and provided at one end with a beveled gear 31 which meshes with a companion beveled gear 32 fast to one end of a longitudinal shaft 33, the latter being provided at its rear end with a bevel gear 34 which is in mesh with a bevel gear 35 fast to an end of the shaft 26. The upper portion of the standard 27 passes through the opening at the front end of the bar 11. When one end of the runner 10 is moved upward, rotary movement is imparted to the shaft 33 by means of the gearing hereinbefore described, and the motion thus imparted to the shaft 33 is transmitted to the other end portion of the runner by means of the gearing set forth. It will be understood that by reason of the provision of the shaft 33 and having the same connected to the standards 23 and 27, vertical movement imparted to either standard is transmitted to the other, thereby causing the runner 10 to move vertically and remain parallel to a given position at all stages of its movement. By having the equalizing shaft 26 geared at opposite ends to the shafts 33, movement imparted to one shaft is transmitted to the other, hence any vertical movement imparted to a runner 10 upon one side of the machine, results in imparting a corresponding movement to the other runner upon the opposite side of the machine, with the result that strain and unequal movement are compensated for and distributed. The lower portion of each standard 27 is made hollow, as shown at 36, and is in communication with the opening 21, being fitted by means of a screw thread connection to a nipple 37 provided near the front end of the runner 10. A hose pipe of flexible tubing 38 is coupled to a nipple 39 projected forwardly from the standard 27 and in communication with the opening 36. The hose pipe 38 serves to conduct the fluid medium from a suitable source to the opening 21 through the lower portion of the standard 27.

At a convenient point of the running gear, a tank 40 is located and constitutes a reservoir for the fluid medium by means of which the jacks are operated, said fluid medium being preferably a liquid, such as oil. A pump 41 conveniently arranged upon the running gear is connected with the reservoir 40 and its piston may be connected to any convenient operating means, and for convenience is shown as having connection with the lower end of an operating lever 42, although in practice it may be coupled to the engine or other moving part to be actuated thereby. A pipe 43 leads from the rear end of the pump cylinder and is connected with the hose pipes 38 which leads to the runners upon opposite sides of the machine. A short pipe 44 connects the rear portion of the pump cylinder with the reservoir 40 and is provided with a check valve which closes towards the reservoir and opens towards the pump cylinder to admit of a portion of the liquid being thrown from the reservoir into the pump cylinder when the piston is moved forward in the pump cylinder. Upon moving the piston of the pump rearward, the check valve in the pipe 44 closes, thereby preventing the liquid passing from the pump back into the reservoir and insuring its being conducted to the jacks at opposite sides of the machine. A valve connection 45 is provided between the pipe 43 and the reservoir 40, and when the valve thereof is opened the liquid is permitted to pass freely from the cylinders of the jacks and back into the reservoir 40. The valve of the connection 45 is under control of the operator. A shaft 46 has an end portion extended within convenient reach of the operator and is provided with a hand wheel 47. The opposite end of the shaft 46 is connected by bevel gear 48 or in any desired way to the stem 49 of the valve. Upon operating the hand wheel 47 the valve in the connection 45 may be opened more or less, thereby regulating the passage of the liquid from the jacks back into the reservoir, and when said valve is closed, the jacks are held at a given point, thereby maintaining the relative adjusted position of the drivers.

A driver is located at each side of the machine and consists of a traction wheel 50, the same being mounted upon the arm of the axle 13 and may be fast thereto to rotate therewith. An arched brace or stay $12^a$ extends over the upper portion of the driver or traction wheel, as indicated most clearly in Fig. 7. The brace or stay consists of two members, as shown most clearly in Fig. 6. The outer arms of the members are downwardly diverged, whereas the inner arms are downwardly converged and terminate in a bearing which receives the axle 13, the outer arms being bolted or otherwise secured to opposite end portions of the bar 11. Each driver is located as close as possible to the proximal runner. The traction wheels have cogs at intervals around their periphery to make positive connection with the icy surface and prevent slipping. The drivers are vertically adjustable to admit of their being moved either into an operative position or into an inoperative position, and in order that the precise position of the drivers may be determined, indicating means are provided, the indicator 51 being conveniently located so as to be under observation at all times. For operating the indicator movement is taken from the equalizing shaft 26. As shown most clearly in Fig. 2, a bevel gear 52 is fast to the shaft 26 and meshes with a bevel gear 53 fast to a shaft 54, the latter extending lengthwise of the machine and being provided at or near its front end with a gear wheel 55 which is in mesh with a gear wheel 56 fast to the lower end of an upright shaft 57, the same being geared at or near its upper end to the movable part of the indicator. It is to be understood that the indicator 51 may be of any construction and located at the most convenient point, and that the connecting means for transmitting movement thereto may be of any construction and relative arrangement best adapted to the style and make of machine equipped with the invention.

To prevent slipping of the runners and to insure responsive action to the steering mechanism, particularly when speeding upon icy surfaces, it is preferred to provide each runner with a cutter 58, the same consisting of a blade placed against a side of the runner and secured thereto by means of fastenings 59. The blade 58 is provided with slots preferably extending through the upper edge thereof, thereby admitting of the blade being readily removed for sharpening or other purpose, as also to provide for adjusting said blade to compensate for wear. The blades are located upon the outer side of the runners so as to be more readily accessible and to prevent possible interference with the drivers.

When an automobile or like vehicle is equipped with the invention, it is supported upon the front and rear runners and is driven by the tractive force of the drivers. The driving cogs may be projected to a greater or less extent below the runners 10 according to the nature of the surface over which the vehicle is to be propelled by operating the jacks. When the surface is hard and consists of ice firmly frozen, it is not necessary to have the driving cogs project to any very great distance below the surface of the runners, but when the surface is snow or consists of slush or rotten or soft ice, it is desirable to have the driving cogs project some distance in order to penetrate the surface to an extent to prevent slipping. When coasting, the drivers are moved upward to wholly withdraw the driving cogs to prevent their projection below the surface of the runners which would materially impede the progress of the machine or necessitate the driving of the engine at a high speed in order to secure the full benefit of the down grade. When speeding, and should it be required to bring the machine to a stand-still, the motor is shut off and the drive wheels lowered to cause the driving cogs to project below the surface of the runners and to bite into the surface and act as a brake to check the speed of the machine. The drivers are moved vertically by operating the pump 41 which may be actuated by hand or by the motor or engine employed for driving the machine according to connections. The forward stroke of the plunger or piston of the pump draws a supply of liquid from the reservoir 40 and the rear stroke of said plunger or piston forces said liquid from the bottom cylinder into the hose pipes 38, thence through the lower portion of the standards 27 into the openings 21 of the runners 10, thence into the lower members of the jacks. As the liquid enters the cylinders 14, it exerts an upward pressure upon the plungers 16, thereby forcing the bars 11 upward and lifting the drivers and the machine. It is to be understood that the several connections have a tight fit to prevent leakage, hence the drivers when adjusted to a vertical position, are held by confining the liquid. Upon opening the valve in the connection 45, liquid may be passed from the jacks back into the reservoir and thereby permit the drivers to lower under the weight of the running gear and parts supported thereby. The springs 17 act as cushioning means to neutralize vertical jar or vibration, it being remembered that the plungers 16 are moved upward by the liquid confined beneath them in the lower portions of the cylinders 14, hence said plungers, when adjusted, remain stationary, whereas the bars 11 are adapted to have play by reason of the springs 17, the downward movement being limited by the rods 18 coming in contact with the plungers 16.

To limit the vertical movement of the vehicle body or framework supporting the drivers with reference to the runners, stop means are interposed between the runners and the framework supporting the driver. As shown, an arch 60 is fast to each runner 10 and its upper end is apertured to receive a bolt or like part 61 fast to the bearing or frame 11, said bolt or fastening 61 being headed at its lower end to engage with the underside of the cross piece of the arch 60 through which it is free to play. Any means equivalent to the parts 60 and 61 may be employed to limit the upward movement of the frame 11 so as to prevent the withdrawal of the plungers 16 from the cylinders 14.

In the event of the pump 41 being connected with the motor so as to be operated by means of the power employed for driving the machine, it is proposed to connect the pipe 43 with the reservoir 40 by means of a pipe 62, the same being provided with a check valve 63 adapted to be regulated and serve as a safety valve so that under extreme pressure the valve 63 will be forced open and the fluid returned to the reservoir 40 if the pump is kept in operation. The safety check 63 opens towards the reservoir and is set to become unseated at a given pressure, which is considerably below danger point.

While the attachment may be adapted, with few changes, to vehicles of the automobile type by modifying the construction of the axles to receive the runners and adjunctive parts as hereinbefore indicated, nevertheless, it is preferred to have the rear axle of special construction to receive the runners 10, traction wheels 50 and arched braces 12ª. It is also preferred to have the front axle, front axle arms and auxiliary parts specially designed to receive the front runners and concomitant parts.

While the driver may be utilized as a brake in the manner herein described, it is to be understood that the machine will be provided with a brake mechanism, such as generally used and applied to automobiles now in use.

Having thus described the invention, what is claimed as new is:

1. In combination, a runner, a driver mounted upon the runner, a jack interposed between the driver and runner to effect vertical movement of said driver, said jack comprising a cylinder and a plunger, and means for supplying a fluid medium to the cylinder of the jack to effect movement of the driver.

2. In combination, a runner, a driver mounted upon the runner, a jack for effecting vertical adjustment of the driver and comprising an upper and lower cylinders and a plunger arranged to operate in one of said cylinders, and means for supplying fluid medium to the cylinder in which the plunger is arranged to operate.

3. In combination, a runner, a driver mounted thereon and adapted to be moved vertically, a jack interposed between the runner and driver and comprising a cylinder, a plunger operating in the cylinder, a spring interposed between the plunger and the support for the said driver, and means for supplying a fluid medium to the cylinder in which the plunger operates.

4. In combination, a runner, a vertically adjustable driver mounted upon the runner, a jack interposed between the runner and driver and comprising a cylinder, a plunger arranged to operate in the cylinder, a spring interposed between said plunger and the support carrying said driver, and a rod for stiffening said spring and limiting the relative play of the plunger.

5. In combination, a runner, a framework, a driver supported by said framework, a series of jacks interposed between the runner and framework, a fluid conductor common to all of the jacks and having connection therewith, and means for supplying a fluid medium to said conductor.

6. In combination, a runner, a framework, a driver mounted upon the framework, a series of jacks, each consisting of telescoping cylinders and a spring actuated plunger, one series of cylinders having connection with the runner and the other series having connection with said framework and with the series of plungers, and means for supplying a fluid medium to the cylinders of the jacks in which said plungers are arranged to operate.

7. In combination, a runner, a framework, a driver supported by the framework, cylinders projected upward from the runner, other cylinders pendent from the framework and telescoping with the cylinders having connection with the runner, plungers arranged to operate in the lower cylinders, springs connecting said plungers with the framework, rods connected with the framework and extended through the said springs and serving to stiffen the latter and to limit the relative play of the plungers, and means for supplying a fluid medium to the lower cylinders.

8. In combination, a runner, a framework, a driver mounted upon the framework, adjusting means between the runner and framework, standards interposed between opposite end portions of said runner and framework, a shaft, and gearing connecting opposite ends of said shaft with said standards and the end portions of the framework, whereby both ends of the framework are caused to move alike.

9. In combination, a runner, a vertically adjustable framework, a driver mounted upon the framework, an arched brace or stay extending over the driver and having connection with the framework, adjusting means between the runner and framework, standards connected to opposite end portions of the runner, and movable with reference to the framework, a shaft mounted in bearings of said framework, and gearing between opposite end portions of the shaft and the said standards.

10. In combination, a runner having a longitudinal opening, nipples projected from the runner, cylinders threaded to said nipples, a framework, other cylinders pendent from said framework and telescoping with the cylinders having connection with the runner, plungers arranged to operate in the lower cylinders, springs interposed between said plungers and the framework a driver mounted upon the framework, and means for supplying a fluid medium to the opening of the runner for charging the cylinders to effect adjustment of the framework and driver.

11. In combination, a vehicle, supporting runners therefor, a drive shaft mounted in bearings of the vehicle framework, drivers mounted upon said drive shaft, and fluid operated jacks interposed between the runners and the framework of the vehicle to effect vertical adjustment of said framework and the drivers.

12. In a vehicle, the combination of runners, a framework, a driver mounted upon the framework, adjustable means between the runners and framework to move the driver into or out of an operative position, and equalizing means between the runners and the framework at opposite sides of the machine to compel both sides of the machine to move alike.

13. In combination, a vehicle, supporting means therefor, fluid operated jacks between said supporting means and the framework of the vehicle, a driver mounted upon the framework, a reservoir for containing a fluid medium, a pump, a valved connection between the pump and reservoir, a pipe leading from the pump, conductors between said pipe and the jack mechanism at opposite sides of the machine, and a valve connection between the said pipe and reservoir to admit of return of the fluid medium when it is required to permit the vehicle body or framework to lower.

14. In combination, a vehicle, supporting means therefor, adjusting means between said supporting means and the framework of the vehicle, a driver mounted upon the framework of the vehicle and movable vertically therewith, equalizing means between the relatively movable parts at opposite sides of the machine between the indicator and the vertically adjustable part of the vehicle frame to designate the relative adjusted position of said vehicle framework.

15. In combination, a runner provided with a hub having a cut-away portion, a segment arranged within the said cut-away portion, and springs interposed between opposite ends of the segment and the terminal ends of the hub bordering upon the cut-away portion thereof.

16. In combination, a runner provided with a hub having a cut-away portion, a segment arranged in the cut-away portion, and a cap plate closing the open side of said cut-away portion and having connection with said segment.

17. In combination, a vehicle, supporting means therefor, fluid operated jacks between said supporting means and the framework of the vehicle, a driver mounted upon the framework, a reservoir for containing a fluid medium, a pump, a valved connection between the pump and reservoir, a pipe leading from the pump, conductors between said pipe and the jack mechanism at opposite sides of the machine, a valve connection between the said pipe and reservoir to admit of return of the fluid medium when it is required to permit the vehicle body or framework to lower, a pipe leading to the reservoir from the pipe leading from the pump to the jack mechanism, and a spring adjusted safety valve in the length of said pipe to allow the fluid to return from the pump to the reservoir under extreme pressure.

In testimony whereof I affix my signature in presence of two witnesses.

HENRY H. ROHLF.

Witnesses:
  J. KROMSCHINSKI,
  H. S. RITCHIE.